(12) United States Patent
Caldoro et al.

(10) Patent No.: US 7,628,947 B2
(45) Date of Patent: Dec. 8, 2009

(54) PROCESS FOR MANUFACTURING A GLAZING

(75) Inventors: Nicola Caldoro, Torino (IT); Ciro Paudice, Vasto (IT)

(73) Assignee: Pilkington Italia S.p.A., San Salvo (IT)

( * ) Notice: Subject to any disclaimer, the term of this patent is extended or adjusted under 35 U.S.C. 154(b) by 721 days.

(21) Appl. No.: 10/508,756

(22) PCT Filed: Mar. 21, 2003

(86) PCT No.: PCT/EP03/03030

§ 371 (c)(1),
(2), (4) Date: Mar. 16, 2005

(87) PCT Pub. No.: WO03/080321

PCT Pub. Date: Oct. 2, 2003

(65) Prior Publication Data

US 2005/0167883 A1     Aug. 4, 2005

(30) Foreign Application Priority Data

Mar. 22, 2002    (EP) .................................. 02425183

(51) Int. Cl.
*B29C 45/14*    (2006.01)
*B29D 5/00*     (2006.01)
*B29C 45/73*    (2006.01)

(52) U.S. Cl. ...................... 264/259; 264/252; 264/254; 264/255; 264/279; 264/279.1; 264/296; 264/299; 264/319; 264/320; 264/327

(58) Field of Classification Search ......... 264/250–252, 264/259, 261, 327; 156/107–109, 245; 425/117, 425/DIG. 3; 296/84.1, 93, 95.1
See application file for complete search history.

(56) References Cited

U.S. PATENT DOCUMENTS 4,795,667 A * 1/1989 Armstrong .................... 428/77

(Continued)

FOREIGN PATENT DOCUMENTS

DE          26 46 058 A1     5/1977

(Continued)

*Primary Examiner*—Jeffrey Wollschlager
(74) *Attorney, Agent, or Firm*—Marshall & Melhorn, LLC

(57) ABSTRACT

An appendage (7) is molded onto a glazing profile (3) provided around the periphery of a pane of glass (2), the process comprising advancing a mold (20) into sealing contact with an appropriate part of the profile, introducing a predetermined quantity of polymer material (39) into a mold cavity (40), and allowing the polymer material to bond to the glazing profile. The pane of glass remains outside the mold cavity, and is preferably not contacted by the mold. The polymer material may be thermosetting or thermoplastic, and is preferably introduced into the mold cavity while the mold is open. The material may be poured if it is in a fluid condition, or, if it is thermoplastic, it may be introduced in the form of a preformed piece (50) which is superficially melted to bond it to the glazing profile. The process is suitable for molding sharp corners onto extruded profiles on vehicle glazings (1).

10 Claims, 3 Drawing Sheets

U.S. PATENT DOCUMENTS

| | | | |
|---|---|---|---|
| 4,999,147 A * | 3/1991 | Kojima et al. | 264/139 |
| 5,057,265 A * | 10/1991 | Kunert et al. | 264/511 |
| 5,061,429 A * | 10/1991 | Yoshihara et al. | 264/252 |
| 5,068,076 A * | 11/1991 | Weaver et al. | 264/511 |
| 5,069,849 A | 12/1991 | Wain | |
| 5,069,852 A * | 12/1991 | Leone et al. | 264/239 |
| 5,316,829 A | 5/1994 | Cordes et al. | |
| 5,413,748 A * | 5/1995 | Garza | 264/135 |
| 5,456,874 A | 10/1995 | Cordes et al. | |
| 5,547,359 A | 8/1996 | Cordes et al. | |
| 5,580,628 A | 12/1996 | Cordes et al. | |
| 5,916,600 A * | 6/1999 | Dubay et al. | 425/116 |
| 5,984,656 A | 11/1999 | Kittel | |
| 6,071,108 A * | 6/2000 | Gohr et al. | 425/116 |
| 6,461,137 B1 * | 10/2002 | Ash et al. | 425/127 |
| 6,495,082 B1 * | 12/2002 | Ash et al. | 264/240 |
| 6,824,722 B1 | 11/2004 | Cornils et al. | |

FOREIGN PATENT DOCUMENTS

| | | |
|---|---|---|
| DE | 19537693 C1 | 10/1996 |
| DE | 19837348 A1 | 3/2000 |
| EP | 0 524 060 A1 | 1/1993 |
| EP | 1 023 154 B1 | 8/2000 |
| EP | 0 768 162 B1 | 12/2002 |
| FR | 2 332 409 | 6/1977 |
| GB | 1 478 714 | 7/1977 |
| GB | 1 544 420 | 4/1979 |
| GB | 2124141 A | 4/1983 |
| JP | 59124810 | 7/1984 |
| JP | 3130136 | 6/1991 |
| JP | 09123213 * | 5/1997 |
| WO | WO 01/96134 A2 | 12/2001 |

* cited by examiner

PROCESS FOR MANUFACTURING A GLAZING

FIELD OF THE INVENTION

The present invention relates to a process for manufacturing a glazing, comprising moulding an appendage onto a glazing profile provided around at least part of the periphery of a pane of glass. More particularly, the invention relates to such a process used for modifying the shape of the glazing profile adjacent a corner of the pane of glass. The invention also relates to a mould for use in the process and to glazings thereby produced. Such glazings may especially be used in vehicles.

BACKGROUND OF THE INVENTION

Concerns of vehicle styling and visibility require that some vehicle glazings have sharp corners (i.e. corners of low radius of curvature). However, in some of the processes employed to produce glazing profiles, it is difficult, if not impossible, to provide the profiles with corresponding sharp corners.

DE 26 46 058 and GB 1 478 714 are documents from the 1970's which disclose methods of forming corners on preformed weather-strips, involving cutting or deforming the existing strip first. However, the use of weather-strips to glaze vehicles is now obsolete, having been superseded by glazing technologies in which the glazing profile is attached to the pane of sheet glazing material (e.g. glass or plastics) before the glazing is placed in an aperture in a vehicle body (previously, the pane, weather-strip, and any fixing strip were all placed in the aperture separately, and assembled therein).

One process currently employed to produce a glazing profile is extrusion, in which the profile is formed in situ on a pane of sheet glazing material by extruding a bead of polymer of a pasty consistency onto the pane, and allowing it to set. The bead is extruded from an extrusion die which is moved around the perimeter of the pane. Difficulties may be experienced with this process when extruding around corners, because the part of the profile towards the outside of the corner (the "outward part") extends along a longer path than the inward part. Consequently, as it moves around the corner, the outer part of the die requires a greater rate of supply of polymer than the inner part, which may be difficult or impossible to arrange, and the outward part of the profile is likely to be deficient in some respect if extruded with insufficient polymer. These difficulties increase as the radius of curvature of the corner decreases. Furthermore, when it is desired that the profile has a substantially square corner, this shape may be impossible to achieve given that the outer part of the extrusion die necessarily describes an arc of a circle as it turns the corner. Glazing profiles produced by other processes, e.g. edge encapsulation (i.e. moulding directly in situ onto the glass) may also require modification, e.g. local augmentation or completion of the profile. This may for example avoid the cost of machining a complete new mould for a minor variant.

EP-A-524 060 discloses a process and mould for the improvement of a glazing which has a peripheral profile extruded in situ, the profile having a polymer part completing or replacing the profile. The process is especially intended for the situation where a portion of the profile as extruded is badly shaped, e.g. where the start and finish of the extruded profile meet; remedying such portions of the profile is known as "rectification" in the automotive glazing industry. Both the over-moulding and re-moulding of a corner are also described, using a complicated mould comprising upper and lower parts, a bottom plate, sliding plates, jacks, movable sealing slats and cut-outs to compensate for variations in glass size and thickness. However, even with the precautions incorporated in the mould design, the risk of glass breakage remains.

It would be desirable to provide a process and mould for completing or supplementing a glazing profile, which is not only simplified, but also further reduces the risk of glass breakage.

It has now been realised that by dispensing with the requirement for the process to carry out rectification, design constraints are removed, enabling a fresh approach to be taken to the problem of moulding onto the profile.

SUMMARY OF THE IVENTION

The present invention provides a process for manufacturing a glazing, comprising moulding an appendage onto a glazing profile provided around at least part of the periphery of a pane of glass, the process further comprising the steps of:
advancing a mould into sealing contact with a part of the profile onto which the appendage is to be moulded
introducing a predetermined quantity of polymer material into a mould cavity provided in the mould
allowing the polymer material to bond to the glazing profile, characterised in that the pane of glass remains outside the mould cavity.

The invention also relates to a mould for moulding an appendage onto a glazing profile provided around at least part of the periphery of a pane of glass, the mould having a mould cavity and being constructed and arranged such that the pane of glass remains outside the mould cavity during the moulding process.

Removal of the requirement for rectification means that no cutting of the pre-existing profile is necessary, nor need any part of the pre-existing profile be replaced, i.e. the moulded appendage is purely additional to the pre-existing profile. This makes it possible to design the mould so that it makes sealing contact solely with the pre-existing profile, and not with the pane of glass, which has the advantage that it greatly reduces the possibility of breaking the glass.

A further stated disadvantage of the mould of EP-A-524 060 is that the injection nozzle must be removed from the injection hole immediately following the filling of the mould to ensure that the polymer material does not harden within the nozzle. In the present invention, the mould is preferably open when the polymer material is introduced into it, the mould only being closed after the introduction of the polymer material, and the pane of glass remains outside the mould cavity even when it is closed. The need for an injection hole, and the danger of material solidifying within it or the nozzle, are thereby obviated. Even when the mould is closed, the clamping force is low so that the pre-existing profile is not deformed during the moulding operation.

Preferably, the polymer material is in a fluid condition when it is introduced into the mould.

Alternatively, the polymer material may be thermoplastic, and may then comprise a preformed piece of solid material when it is introduced into the mould. In this case, the mould is heated, and the moulding operation has the effect of joining the preformed piece of solid material to the pre-existing profile.

The glazing profile may be extruded onto the pane of glass, and the physical form of the glazing profile preferably remains unaltered when the appendage is moulded onto it. That is, the profile is not cut, nor is it deformed (e.g. splayed, kinked or bent) before or during moulding on the appendage. The process is also particularly suitable when the glazing profile comprises a basal portion attached to the pane of glass and a lip which projects from the basal portion, and the appendage is moulded onto the lip. Optionally, the appendage forms an extension of the lip. Preferably, the extension of the lip is positioned at a corner of the pane of glass so as to provide the lip with a vertex adjacent the corner. As has already been mentioned, there is a particular need to provide sharp corners on glazing profiles so that their final shape corresponds to that of the panes of glass to which they are bonded. A sharp corner may have a radius of 40 mm or less, preferably 20 mm or less, and quite possibly 10 mm or less.

Advantageously, the mould comprises a first mould half which makes contact with a first surface of the glazing profile, said first surface facing away from the pane of glass, and a second mould half which makes contact with a second surface of the glazing profile, said second surface facing towards the pane of glass, wherein the second mould half is maintained at a lower temperature than the first.

Preferably, not only is the glass outside the mould, but the mould does not make contact with the pane of glass at all.

The invention will now be further described by way of the following specific embodiments, which are given by way of illustration and not of limitation, and with reference to the accompanying drawings in which:

DETAILED DESCRIPTION OF THE INVENTION

Figure 1:
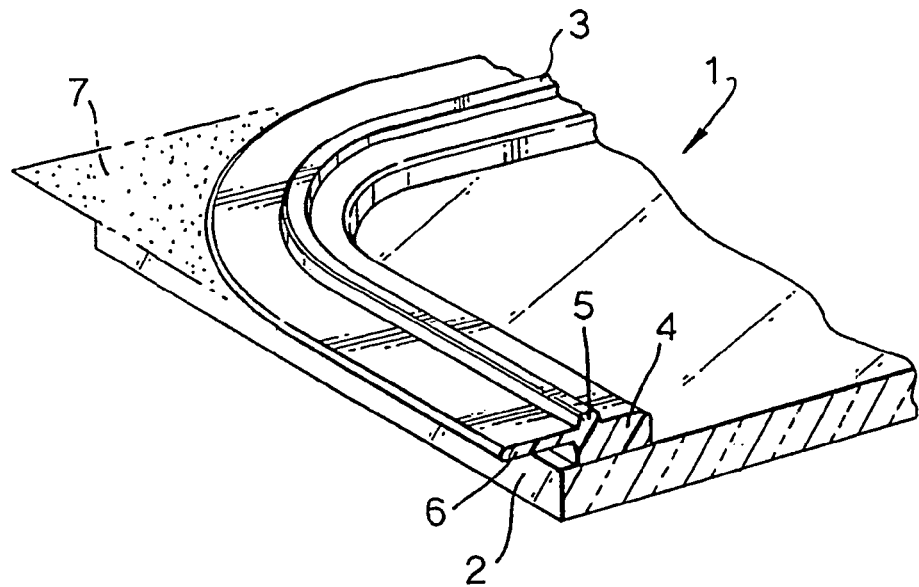
FIG. 1 is a perspective view, partly in section, of part of a glazing according to the invention.

Referring to FIG. 1, there is shown part of a glazing 1, comprising a pane of glass 2 which bears a glazing profile 3 around at least part of its periphery. The pane of glass may be toughened or laminated, tinted or clear. The glazing profile comprises a basal portion 4 which adheres to the glass, a spacer portion 5 and a lip 6. The spacer portion serves to ensure correct positioning of the glazing during installation, e.g. in vehicle bodywork, by providing the desired spacing between the vehicle bodywork and the pane of glass. In this situation, the lip bridges the gap between the glass and the bodywork, providing an aesthetically pleasing appearance, and preventing entry of dirt. One may also distinguish between a first surface of the glazing profile which faces away from the pane of glass, i.e. upwards in FIG. 1, and a second surface of the glazing profile which faces towards the pane of glass, i.e. downwards in FIG. 1; in the profile illustrated, the second surface in practice comprises the lower face of the lip 6.

The glazing has an appendage 7 comprising polymer material which is moulded onto the glazing profile 3, and takes the form of an extension to the lip 6. The appendage is moulded onto the radiused part of the glazing profile at the corner of the glazing, and is shaped so that the resultant shape of the glazing profile corresponds to that of the pane of glass at the corner. The formerly radiused lip is thereby provided with a vertex adjacent the corner. Of course, the appendage may take other shapes according to the particular requirements of different glazings. Preferably the appendage is moulded from the same polymer material as the glazing profile 3, which is already bonded to the pane of glass.

The glazing profile may have been extruded in situ on the glass, directly moulded in situ on the glass, or preformed and bonded to the glass; the key requirement being that the glazing profile is already attached to the pane of glass at the time when the appendage is moulded onto it.

Figure 2:
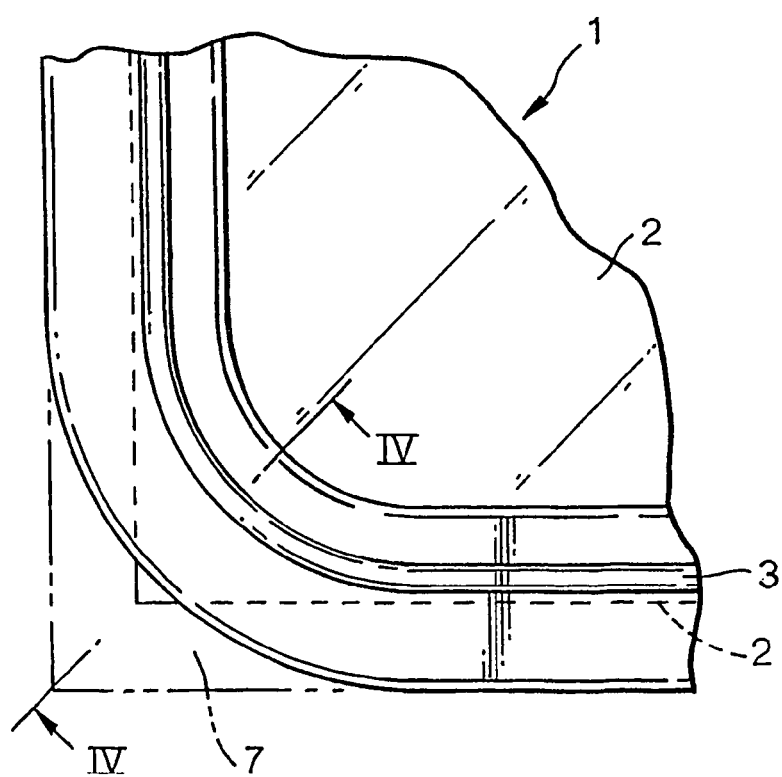
FIG. 2 is a plan view of part of the glazing of FIG. 1.

FIG. 2 shows a plan view of the glazing, but with the position of the appendage merely indicated in phantom. The corner of the pane of glass may be seen, and it may be more clearly observed how the appendage augments the original shape of the glazing profile to match the corner. In this case, the pane of glass has a sharp corner approximating to a right angle, and the appendage confers a similar shape to the glazing profile. In the case of a vehicle windscreen, which has the general shape of a trapezium, the corner is similar to a right angle, but the angle is slightly greater than 90° when it is a top corner, and slightly less than 90° when it is a bottom corner.

Figure 3:
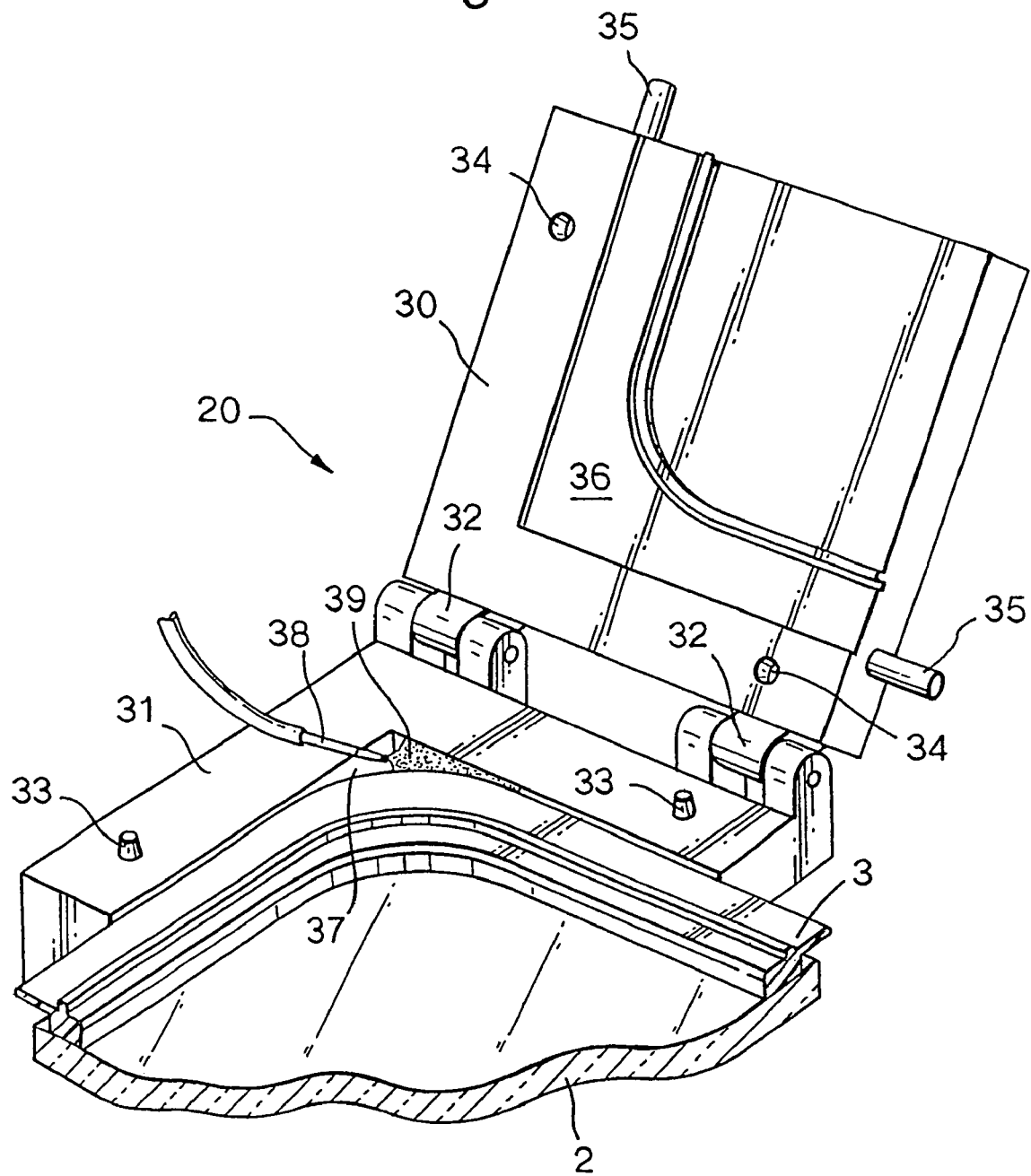
FIG. 3 is a perspective view of a novel mould for manufacturing a glazing according to the invention, the mould being shown open, with part of a glazing in position.

FIG. 3 illustrates a novel mould 20 for manufacturing a glazing according to the invention. It comprises a first mould half 30, which is the upper mould half in the Figure, and a second mould half 31, which is the lower mould half in the Figure. The two mould halves are pivotally articulated to one another by means of hinges 32, but other articulation arrangements are possible. Locating studs 33 and corresponding holes 34 are provided to ensure accurate location of the two mould halves on closure. For many polymer materials it is desirable to heat the mould before and during the moulding operation, and so the mould may be provided with heating means such as conduits (FIG. 4) passing through the mould halves, which are supplied with heating fluid via hoses (not shown) attached to nozzles 35. This arrangement may also be used to cool the mould, e.g. after introduction of thermoplastic polymer material, or to allow removal of the glazing from the mould.

The mould halves are provided with respective recesses 36, 37 which together form a moulding cavity when the mould is closed. Polymer material 39 is introduced into the recess 37 in the lower mould half as will be explained in more detail below, one method being to introduce it in fluid form via a nozzle 38. In any case, the material is preferably introduced when the mould is open, as this obviates the need for an injection hole, and eliminates both wastage resulting from material left in the sprue, and corresponding marks on the final product. Furthermore, injection would have to be carried out under pressure, which would then necessitate a corresponding clamping pressure to keep the mould closed; the higher the clamping pressure, the greater the danger of deforming the existing glazing profile. By introducing the moulding material with the mould open, the operation is in effect carried out at atmospheric pressure.

Figure 4:
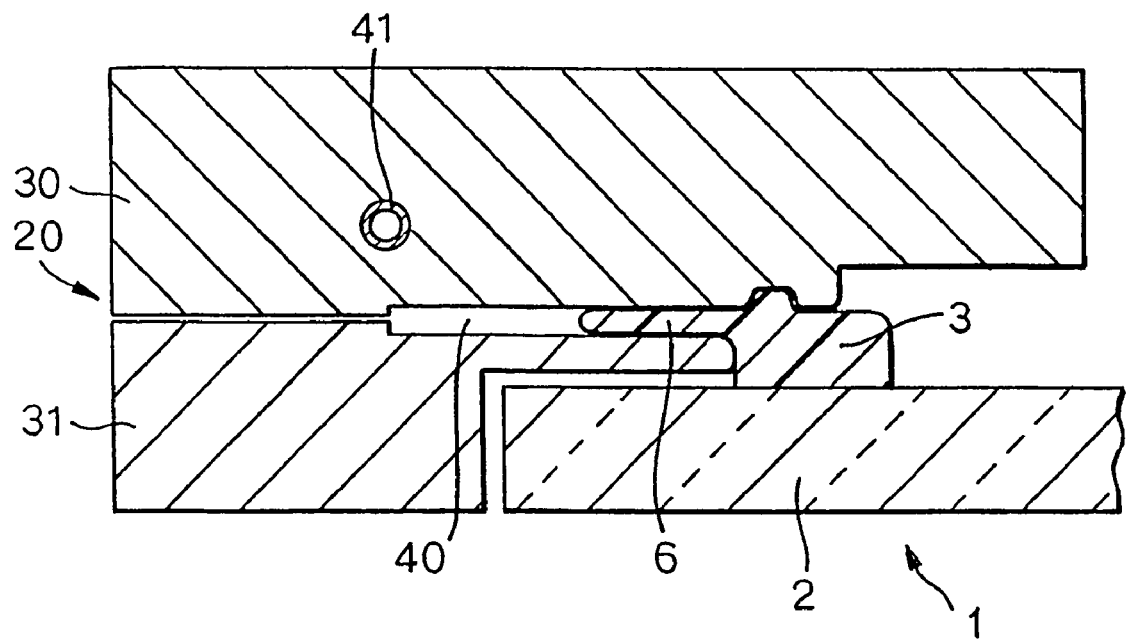
FIG. 4 is a cross-section of the mould and glazing of FIG. 3, the line of section corresponding to that marked on FIG. 2 as IV-IV, the mould being shown closed.

FIG. 4 shows the mould 20 and glazing 1 in cross-section, the line of section corresponding to that marked on FIG. 2 as IV-IV. While the mould itself is not shown in FIG. 2, the position it would occupy may be deduced by comparison with FIG. 3, and the line of section extends diagonally through the mould from corner to corner. In FIG. 4 the mould is shown in its closed condition; the first or upper mould half 30 is in sealing contact with the first or upper portion of the glazing profile 3, and the second or lower mould half 31 is in sealing contact with the second or lower portion of the glazing profile 3. A clamping force is applied to the closed mould in conventional manner, but as the mould is small, and the polymer of the glazing profile naturally forms a good seal, only modest force is required. A mould cavity 40 is defined by the closed mould halves together with the glazing profile, the cavity being formed by the conjunction of the recesses 36 and 37. It may clearly be seen from FIG. 4 how the pane of glass 2 remains outside the mould cavity.

The relationship between the pane of glass and the mould cavity results in important advantages of the present invention, given certain inherent qualities of glass. On the one hand, the pane of glass is susceptible to variations in its size and shape resulting from the processing which it has undergone, and on the other hand it is of course prone to breakage, it being a brittle material. Now, designing a mould to mould onto a glazing profile only (i.e. unlike known moulds, the novel mould is no longer required to mould directly onto glass) has the consequence that it is no longer necessary to seal the mould to the glass. As a result of adapting the mould to seal against the glazing profile only, it becomes possible to mould with the pane of glass outside the mould cavity, and this in turn means that the mould no longer need make contact with the glass. Variations in size and shape of the pane of glass are then easy to accommodate simply by adjusting the mould position relative to the glass, and as no clamping force is exerted on the glass, the possibility of breakage is well nigh eliminated.

It may be seen from FIG. 4 that the mould cavity is adapted to produce a moulding which forms an extension of the lip 6. The invention is particularly suitable for moulding onto a lip, projection, overhang or similar, since it is easy to adapt the mould to seal onto such an element. However, by suitable choice and orientation of mould split line it should be possible to form a seal between each mould half and most glazing profiles which are in commercial use, thereby allowing one to mould an appendage onto such glazing profiles.

FIG. 4 also shows a conduit 41 which (as mentioned in connection with FIG. 3) may be used to heat or cool the first or upper mould half. Although no conduit is shown in the second or lower mould half, it could be provided with a conduit if heating or cooling were required. In actual fact, when the apparatus is used to mould onto a pane of laminated glass, it may be desirable to maintain the lower mould half at a lower temperature than the upper mould half, since the lower mould half receives the pane of glass, and the plastics interlayer in laminated glass deteriorates if excessively heated. Preferably the temperature of the second mould half does not exceed 130° C., more preferably 125° C.

In practice, one of the small moulds illustrated would be used for each corner of the pane of glass onto which it was desired to mould an appendage, e.g. a sharp corner piece. It is possible to join two or more of the moulds together to form a single larger mould, but this may lose some of the advantageous flexibility with regard to accommodating variations in glass size or shape. Since many vehicle glazings are symmetrical (e.g. windscreens, rear windows or backlights, and rooflights), a typical working set-up for moulding sharp corners onto such a glazing may involve two corner moulds. Preferably these are positioned on floating slidable mountings so that they may be moved to accommodate variations in glass size or shape as mentioned above. Four or more suction cups are provided to hold the pane of glass in conventional manner for the moulding operation.

A process for manufacturing a glazing with the novel mould 20 will now be described. A pane of glass 2 bearing a glazing profile 3 requiring augmentation or completion is placed on the suction cups and centred with respect to the moulds, which have preferably been slid outwards from their normal working positions, and the open moulds are treated with a release agent in conventional manner. The mould halves are maintained at an elevated temperature according to the polymer material used; for polyurethane up to 140° C. is recommended, but where moulding is performed on a windscreen, the lower mould half should be maintained at 130° C. or less, preferably 125° C. or less, to avoid damaging the plastics interlayer.

The moulds are then slidingly advanced towards the glazing until the lower mould halves 31 touch the lower surface of the glazing profile, and then polymer material 39 in a fluid condition is introduced into each recess 37 in each lower mould half. A predetermined quantity of polymer material is introduced via nozzle 38, i.e. the material is in effect poured rather than injected. Preferably the nozzle traverses smoothly from one side of the recess to the other so that the polymer material is deposited without trapping any air bubbles. The material properties and pouring conditions are selected so that the viscosity of the material is sufficient for it to remain in place in the recess, while not being so great as to cause difficulties while pouring. A suitable material is Sikaflex™, 360 HC polyurethane, which is available from Sika AG of Tüffenwies 16, CH-8048 Zürich, Switzerland.

The mould is then closed, and one advantage of the hinged arrangement is that the resulting pivoting movement ensures a sweeping action as the upper mould half closes on the lower mould half, thereby avoiding the entrapment of bubbles. A clamping force is applied to the closed mould in conventional manner, but as already mentioned, the force required is less than for conventional moulding operations, which reduces the risk of deforming the existing glazing profile. That is, the physical form of the glazing profile remains unaltered when the appendage is moulded onto it. A suitable period of time is allowed for the polymer material to cure, e.g. five minutes for the above material, and then the mould is opened and the completed glazing is removed.

The description above mentioned the use of thermosetting polymer materials such as polyurethane. However, the process is also suitable for thermoplastic polymer materials, such as thermoplastic elastomers. While it is possible to introduce certain thermoplastic materials in a hot, molten condition, a preferred way of introducing such materials is as a preformed piece of solid material having the approximate desired shape of the appendage. The piece may be pre-moulded in a small simple conventional mould. A suitable thermoplastic elastomer is sold under the brand name Forprene™, which is available from the company So.F.Ter. S.p.A. of Via Mastro Giorgio 2, 47100 Forli', Italy.

Figure 5:
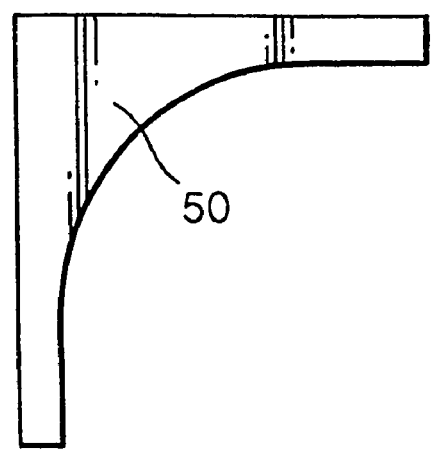
FIG. 5 is a plan view of a preformed piece of solid polymer material which may be moulded onto a glazing profile.

FIG. 5 shows a preformed piece of thermoplastic polymer material 50, which approximates in shape to the appendage 7 moulded onto the glazing profile shown in FIG. 1. That is to say, it is in the shape of a sharp corner as desired on the glazing profile. When moulding such a preformed piece, the process is still substantially the same as described above, but instead of introducing material in a fluid condition from a nozzle, the preformed piece 50 is placed in the recess 37 in the preheated lower mould half 31. The mould is then closed, a clamping force is applied as before, and sufficient time is allowed for melting of the preformed piece to commence. It is not necessary to melt the preformed piece completely; it suffices to melt only its surface thereby causing bonding to the glazing profile, and providing an aesthetic, newly moulded, appearance free of joint lines. It is also unnecessary to melt the glazing profile in its entirety; again, superficial melting is all that is required. The conduits within the mould may also be used to cool it, thereby rapidly solidifying the polymer and permitting opening of the mould.

The invention provides an economical and flexible method of modifying glazing profiles which are attached to glass and produced by techniques such as extrusion and edge encapsulation. It augments or completes parts of the profile while greatly reducing the risk of breakage of the glass, compared with known methods.

The invention claimed is:

1. A process for manufacturing a glazing comprising:

molding an appendage onto a glazing profile provided around at least part of the periphery of a pane of glass, the process further comprising the steps of;

advancing a mold into sealing contact with a part of the profile onto which the appendage is to be molded, wherein the mold comprises a first mold half and a second mold half;

introducing a predetermined quantity of polymer material into a mold cavity provided in the mold wherein the mold is open when the polymer material is introduced into it, the mold being closed after the introduction of the polymer material, wherein the pane of glass remains outside the mold cavity even when it is closed, and wherein the mold does not make contact with the pane of glass even when the mold is closed; and allowing the polymer material to bond to the glazing profile.

2. A process as claimed in claim 1, wherein the polymer material is in a fluid condition when it is introduced into the mold.

3. A process as claimed in claim 1, wherein the polymer material is thermoplastic, and comprises a preformed piece of solid material when it is introduced into the mold.

4. A process as claimed in claim 1, wherein the glazing profile is extruded onto the pane of glass, and the physical form of the glazing profile remains unaltered when the appendage is molded onto it.

5. A process as claimed in claim 1, wherein the glazing profile comprises a basal portion attached to the pane of glass and a lip which projects from the basal portion, and wherein the appendage is molded onto the lip.

6. A process as claimed in claim 5, wherein the appendage forms an extension of the lip.

7. A process as claimed in claim 6, wherein the extension of the lip is positioned at a corner of the pane of glass so as to provide the lip with a vertex adjacent the corner.

8. A process as claimed in claim 1, wherein the mold comprises a first mold half which makes contact with a first surface of the glazing profile, said first surface facing away from the pane of glass, and a second mold half which makes contact with a second surface of the glazing profile, said second surface facing towards the pane of glass, wherein the second mold half is maintained at a lower temperature than the first.

9. A process as claimed in claim 8, wherein the temperature of the second mold half does not exceed 130° C.

10. A process as claimed in claim 8, wherein the temperature of the second mold half does not exceed 125° c.

* * * * *